July 18, 1961 R. B. DOME 2,993,177

PUSH-PULL AUDIO AMPLIFIER DIRECT CURRENT VOLTAGE DIVIDER

Filed July 15, 1959

INVENTOR
ROBERT B. DOME

BY Donald N. Timbie
HIS ATTORNEY

United States Patent Office 2,993,177

Patented July 18, 1961

2,993,177

PUSH-PULL AUDIO AMPLIFIER DIRECT CURRENT VOLTAGE DIVIDER

Robert B. Dome, Geddes Township, Onondaga County, N.Y., assignor to General Electric Company, a corporation of New York Filed July 15, 1959, Ser. No. 827,392
9 Claims. (Cl. 330—70)

This invention relates to a push-pull audio frequency amplifier that provides a well stabilized voltage equal to a deisred fraction of the B+ voltage.

In television receivers, some tubes require the full B+ voltage, but many are designed to operate with half as much. It would therefore be possible to connect the former tubes to an output of the direct current power supply at which the full B+ voltage is available and to connect all the other tubes in parallel with an output of the power supply at which a voltage equal to half of the B+ voltage is available. If this were done, however, the lower voltage supply would have to be capable of providing an amount of current equal to the sum of the current requirements of the tubes connected thereto. In order to avoid the necessity of providing a low B+ voltage of such a large current capacity, it has been customary to connect the direct current paths of some of the low voltage tubes between the low voltage tap and ground and some of them between the tap and B+. In the latter arrangement, the tubes connected between the tap and B+ are selected in so far as possible to draw the same average current as the tubes connected between the tap and ground. If the average currents were always the same, the regulation of the voltage supply would not be important, but in practice the currents vary thus requiring a voltage supply having good regulation.

It has also been recognized that one way of improving the regulation is to connect the tubes that steadily draw large amounts of direct current either between B+ and the tap or between the tap and ground. The usual tube for this purpose is the audio output amplifier. Generally, only one audio amplifier is available. Its capacity being determined by the amount of audio power required. For reasons related to sound quality more than to power, audio power has been supplied by two amplifiers connected in a circuit known in the art as push-pull, but from a direct current point of view the tubes are in parallel across the same voltage supply. Hence their effect on regulation is the same as a single tube drawing the same current. Better regulation could be achieved if the direct current paths were in series, as one tube could be connected between B+ and the tap and the other between the tap and ground.

Accordingly it is an object of this invention to provide a push-pull amplifier circuit in which the direct current paths of the tubes are in series.

Aside from the advantage it has in securing voltage regulation, the push pull amplifier circuit of this invention is advantageous in that it is considerably less expensive than previous push-pull amplifier circuits for the reason that no input transformer is required.

Figure 1:
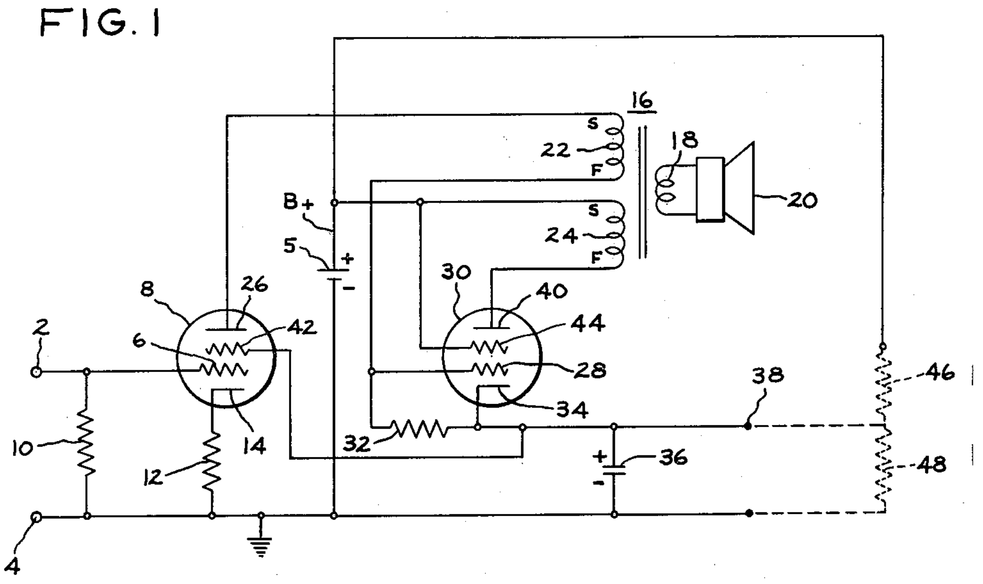
Figure 2:
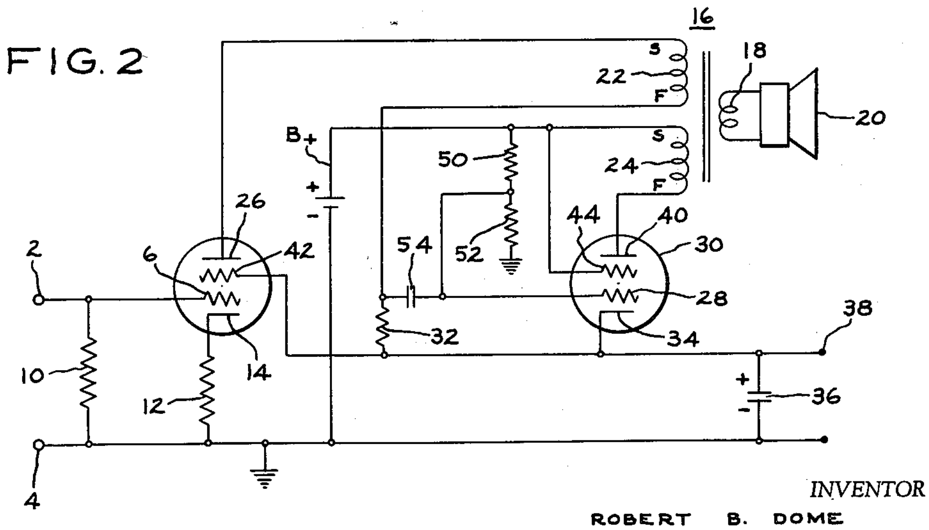

The manner in which this objective is achieved in accordance with the invention will be discussed in connection with the drawings in which:

FIGURES 1 and 2 show circuits embodying the invention that differ in the manner in which one of the tubes is biased.

In the circuit of FIGURE 1 the voltage of audio frequency that is to be amplified is applied between the terminal 2 and a terminal 4 that is connected to a negative terminal, herein shown as being ground, of a source of direct current potential 5. The negative terminal is a point of reference potential. The terminal 2 is connected to a control grid 6 of a first audio amplifier, here shown as being a tube 8, a grid leak resistor 10 being connected between ground and the grid 6. Suitable bias for the tube 8 is provided by a cathode resistor 12 connected between the cathode 14 and ground. An output transformer 16 is provided, its secondary winding 18 being connected to a load, herein indicated as being a loudspeaker 20, and its primary being comprised of two separate primary windings 22 and 24. For purposes of description let it be assumed that the primary windings 22 and 24 are wound in the same sense with respect to secondary winding 18, i.e. in the same direction from the starts "S" to the finishes "F." An anode 26 of the tube 8 is connected to the start of the winding 22, and the finish of this winding is connected to a control grid 28 of an amplifier, herein shown as a tube 30. A bias and coupling resistor 32 is connected between the grid 28 and a cathode 34. A storage capacitor 36 having a low impedance for audio frequencies is connected between the cathode 34 and ground. The start of the winding 24 is connected to the positive terminal of the source 5, indicated by B+, and the finish is connected to an anode 40 of the tube 30. If the tubes 8 and 30 have screen grids, the screen grid 42 of the tube 8 is connected to the same voltage point as the terminal 38, herein shown to be the same as the cathode 34 of the tube 30, and the screen grid 44 of the tube 30 is connected to the positive terminal of the source 5.

Additional direct current loads in the receiver, each requiring approximately one half of the B+ voltage, may be connected to the terminal 38 as shown. For example, a load 46, herein represented by a resistor, is connected betweeen the terminal 38 and B+ potential while a load, 48, also represented by a resistor, is connected between the terminal 38 and ground.

It is possible to use triodes or any suitable form of audio amplifier. Where it is stated that a connection is made, a connection capable of passing direct current is intended.

The operation of the circuit of FIGURE 1 is as follows. Audio frequency signals applied between the input terminals 2 and 4 cause corresponding variations in the current flowing through the tube 8, the primary winding 22, the bias and coupling resistor 32, and to ground via the storage capacitor 36. In passing through the resistor 32, the current produces an audio frequency voltage at the grid 28 that is out of phase with the audio frequency voltage applied to the grid 6 as required for push-pull operation. Any tendency for the cathode 34, and hence the terminal 38, to vary in voltage at an audio rate may be eliminated by making the capacitance of the storage capacitor 36 sufficiently large.

If the characteristics of the tubes 8 and 30 are identical, and if the resistors 12 and 32 have the same value, a well regulated direct current voltage appears at the terminal 38 that is greater than one half the B+ voltage by an amount equal to the drop across either resistor. The voltage can be reduced to one half the B+ voltage by making the resistor 32 larger than the resistor 12 so as to place more bias on the tube 30 and increase its resistance. Conversely, it can be raised by making the resistor 32 smaller than the resistor 12.

In order to attain proper push-pull operation, the current variations of audio frequency supplied by the tubes 8 and 30 to the primary windings 22 and 24 respectively should have the same amplitude. This can be effected by making the resistor 32 have a value equal to $1/g_m$, where $g_m$ is the transconductance between the grid 28 and the anode 40 of the tube 30. That this is so can be understood from the following derivation where $E_2$ represents the amplitude of the audio voltage with respect to ground of the terminal 2, $E_{g6}$ the amplitude of the audio voltage between the grid 6 and the cathode 14, $E_{g28}$ the amplitude of the audio voltage between the grid 28 and the cathode 34, $R_{12}$ the resistance of the resistor 12, $R_{32}$ the resistance of the resistor 32 and $g_m$ the transconductance of grids 6 and 28 to their respective anodes, it being assumed that the tubes 8 and 30 have equal or nearly equal characteristics, and $I_p$ represents the amplitude of the plate current of audio frequency provided by the tube 8.

$$E_{g6}=\frac{E_2}{1+R_{12}g_m}$$

$$E_{g28}=I_pR_{32}=g_mE_{g6}R_{32}$$

Now if the tubes are identical, equal plate currents are produced if $E_{g6}=E_{g28}$ and $$1=g_mR_{32}$$

or $$R_{32}=\frac{1}{g_m}$$

In this derivation the effect of the screen grids 42 and 44 has been omitted as its inclusion would unnecessarily complicate the calculation since the calculation is only intended to show the approximate value of the resistor 32. This is reasonable because the values of commercially acceptable resistors for the purpose may vary by ±10%.

Now in order to obtain any desired fraction of the B+ voltage at the terminal 38, the value of the resistor 12 may be adjusted in accordance with the following derivation wherein $Z_8$ and $Z_{30}$ represent the direct current plate to cathode resistances of the tubes 8 and 30 respectively, $R_{12}$ and $R_{32}$ the resistance of resistors 12 and 32 respectively, $\mu$ the amplification factor between the control grids and the screen grids, again assuming that the tubes 8 and 30 have the same characteristics, and K is a constant. $E_{30}$ is the direct current voltage across the tube 30 and B+ is, of course, the B+ voltage.

$$\frac{E_{30}}{B+}=\frac{Z_{30}}{Z_{30}+Z_8+R_{12}+R_{32}}$$

$$=\frac{\frac{1}{K}+\mu R_{32}}{\frac{1}{K}+\mu R_{32}+\frac{1}{K}+\mu R_{12}+R_{12}+R_{32}}$$

Now assume that $$\frac{E_{30}}{B+}=\frac{1}{2}$$

so that the voltage at the terminal 38 is equal to half the B+ voltage. Of course, any other fraction could be used and would yield different results but the method of calculation would be the same. In clearing the fractions one obtains $$\frac{2}{K}+R_{12}(\mu+1)+R_{32}(\mu+1)=\frac{2}{K}+2\mu R_{32}$$

$$R_{12}=\frac{(2\mu-\mu-1)R_{32}}{\mu+1}=\left(\frac{\mu-1}{\mu+1}\right)R_{32}$$

FIGURE 2 illustrates another embodiment of the invention in which corresponding parts are designated by the same numerals. The difference lies in the fact that the resistor 32 while still providing the audio voltage excitation between the grid 28 and the cathode 34 does not provide the bias. The bias is obtained from the junction of two resistors 50 and 52 that are connected in series between the source of B+ voltage and ground. A capacitor 54 blocks the bias voltage and serves to couple the audio frequency voltage to the grid 28. If the resistors 50 and 52 have the same value, the regulated direct current voltage at the terminal 38 is approximately one half the B+ voltage. Altering the ratio of the resistances of the resistors 50, 52 alters the voltage at the terminal 38. For example, if the resistance of the resistor 50 is increased, the regulated direct current potential between the terminal 38 and ground is decreased. The advantage of the circuit of FIGURE 2 is that the division of the direct current voltage can be made more independent of the audio frequency excitation of the tube 30. For example, if the tube 30 is to be driven harder, the resistance of the resistor 32 could be increased slightly without appreciably affecting the voltage between the terminal 38 and ground.

While the present invention is described by reference to a particular embodiment thereof, it will be understood that numerous modifications may be made by those skilled in the art without actually departing from the invention. I therefore aim in the appended claims to cover all such variations as come within the true spirit and scope of the foregoing disclosure.

What I claim as new and desire to secure by Letters Patent of the United States is:

1. A push-pull audio amplifier circuit that provides a regulated direct current voltage that is a desired portion of a B+ operating potential comprising a first amplifier having at least a cathode, control grid and anode, a point of reference potential, a cathode resistor connected between said cathode and said point, connectors for applying an audio frequency voltage between said grid and said point of reference potential, an output transformer having first and second primary windings having the same winding sense and an output winding having a load connected thereto, a connection between one end of said first primary winding and said anode of said first amplifier, a second amplifier having at least a cathode, control grid and anode, a second resistor connected between the other end of said first primary winding and said cathode of said second amplifier, means for coupling voltages of audio frequency from the end of said latter resistor that is remote from latter cathode to said control grid of said second amplifier, a connection between said anode of said second amplifier and one end of said second primary winding, a source of B+ potential, a connection between said latter source and the other end of said second primary winding and an audio bypass capacitor connected between said cathode of said second amplifier and said point of reference potential, the regulated desired fraction of said B+ potential appearing at said cathode of said second amplifier.

2. A push-pull audio amplifier circuit as set forth in claim 1 in which the resistance of said second resistor is approximately equal $1/g_m$, where $g_m$ is the transconductance between said control grid of said second amplifier and its anode.

3. A push-pull audio amplifier circuit as set forth in claim 1 wherein the said means for coupling the end of said second resistor that is remote from said cathode of said second amplifier to the grid of said second amplifier includes a capacitor having a low impedance for audio frequencies, and wherein third and fourth resistors are connected in series between said source of B+ voltage and said point of reference potential, there being a connection between the junction of said third and fourth resistors and said control grid of said second amplifier.

4. A push-pull audio amplifier circuit that provides a regulated direct current voltage at a desired fraction of a B+ operating potential comprising a first amplifier having at least a cathode, a control grid, a screen grid and an anode, a point of reference potential, a cathode resistor connected between said cathode and said point of reference potential, a grid leak resistor connected between said control grid and said point of reference potential, an output transformer having separate first and second primary windings and a secondary winding having a load connected thereto, a connection between an end of said first primary winding and said anode of said first amplifier, a second amplifier having a cathode, a control grid, a screen grid and an anode, a second resistor connected between the other end of said first primary winding and said cathode of said second amplifier, a source of B+ potential connected between one end of said second primary winding and said point of reference potential, means connecting the other end of said second primary winding to the anode of said second amplifier, means for coupling audio voltage from the end of said second resistor that is remote from said cathode of said second amplifier to said control grid of said second amplifier, a relatively large storage capacitor connected between said cathode of said second amplifier and said point of reference potential, the regulated desired fraction of B+ operating potential appearing across said storage capacitor, a connection between said screen grid of said first amplifier and said cathode of said second amplifier, and a connection between said screen grid of said second amplifier and said source of B+ potential.

5. A push-pull audio amplifier circuit as set forth in claim 4 in which the resistance of said cathode resistor is defined by the expression $$R\left(\frac{\mu-1}{\mu+1}\right)$$

where R is the resistance in ohms of said second resistor and $\mu$ is the amplification factor between control grid and screen grid of said second amplifier.

6. A push-pull audio amplifier circuit in which the direct current paths of the two amplifiers are connected in series comprising in combination a first amplifier having at least a cathode, a control grid, a screen grid and an anode, a source of direct current potential having positive and negative terminals, a cathode resistor connected between said cathode and said negative terminal of said source, an output transformer having separate first and second primary windings and a secondary winding having a load connected thereto, each of said first and second primary windings being wound in the same sense with respect to said secondary winding, a connection between the upper end of said first primary winding and said anode of said first amplifier, a second amplifier having a cathode, control grid, screen grid and anode, a connection between the other end of said first primary winding and said control grid of said second amplifier, a second resistor connected between said control grid of said second amplifier and said cathode of said second amplifier, a storage capacitor connected between said cathode of said second amplifier and said negative terminal of said source of direct current potential, a connection between said screen grid of said first amplifier and said cathode of said second amplifier, a connection between the upper end of said second primary winding and said positive terminal of said source of direct current potential, a connection between the other end of said second primary winding and said anode of said second amplifier, and a connection between said screen grid of said second amplifier and said positive terminal of said source of direct current potential.

7. A push-pull audio amplifier circuit as set forth in claim 6 wherein said second resistor has a resistance defined by the expression $1/g_m$, where $g_m$ is the transconductance of said control grid to said plate of said second amplifier so that the audio frequency currents flowing in said second primary winding have the same amplitude as the audio frequency currents flowing in said first primary winding.

8. A push-pull audio amplifier circuit comprising a first amplifier having a cathode, control grid, screen grid and anode, a source of potential having positive and negative terminals, a cathode resistor connected between said cathode and said negative terminal, an output transformer having first and second primary windings and a secondary winding, said first and second primary windings being wound in the same sense with respect to said secondary winding having a load connected thereto, a connection between one end of said first primary winding and said anode, a second amplifier having a cathode, control grid, screen grid and anode, an audio coupling capacitor connected between the other end of said first primary winding and said control grid of said second amplifier, a second resistor connected between said other end of said first primary winding and said cathode of said second amplifier, a storage capacitor connected between said cathode of said second amplifier and said negative terminal, a connection between the end of said second primary winding corresponding from a winding sense to the end of the first primary winding that is connected to said anode of said first amplifier and said positive terminal, a connection between the other end of said second primary winding and said anode of said second amplifier, a connection between said screen grid of said first amplifier and said cathode of said second amplifier, a connection between said screen grid of said second amplifier and said positive terminal, third and fourth resistors connected in series between said positive and negative terminals, and a connection between the junction of said third and fourth resistors and said control grid of said second amplifier thereby reducing any interdependence between the audio frequency excitation of said control grid of said second amplifier and its bias.

9. A push-pull audio amplifier circuit as set forth in claim 8 wherein said second resistor has a resistance defined by the expression $1/g_m$, where $g_m$ is the transconductance of the control grid of said second amplifier to the plate of said second amplifier.

References Cited in the file of this patent

UNITED STATES PATENTS

| | | |
|---|---|---|
| 2,762,870 | Sziklai et al. | Sept. 11, 1956 |
| 2,770,720 | Murakami et al. | Nov. 13, 1956 |